United States Patent
Papasakellariou et al.

(10) Patent No.: US 6,275,483 B1
(45) Date of Patent: Aug. 14, 2001

(54) FAST AND ACCURATE IDENTIFICATION OF SPREAD SPECTRUM SIGNALS

(75) Inventors: Aristides Papasakellariou; Yuan Kang Lee, both of Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/146,306

(22) Filed: Sep. 3, 1998

(51) Int. Cl.$^7$ .................................................. H04B 7/216
(52) U.S. Cl. .............................................. 370/335; 370/342
(58) Field of Search .................................... 370/335, 330, 370/331, 332, 333, 336, 337, 310, 320, 342, 479, 441, 203, 204, 206; 375/147, 149, 150; 455/436, 442, 422

(56) References Cited

U.S. PATENT DOCUMENTS

| | | | |
|---|---|---|---|
| 5,644,591 | * 7/1997 | Sutton ................................... | 375/200 |
| 5,781,543 | * 7/1998 | Ault et al. ............................. | 370/342 |
| 5,974,080 | * 10/1999 | Papasakellariou .................... | 375/200 |
| 6,021,123 | * 2/2000 | Mimura ................................. | 370/331 |
| 6,085,091 | * 7/2000 | Yoo et al. .............................. | 455/441 |

\* cited by examiner

*Primary Examiner*—Alpus H. Hsu
*Assistant Examiner*—Brian Nguyen
(74) *Attorney, Agent, or Firm*—J. Dennis Moore; W. James Brady, III; Frederick J. Telecky, Jr.

(57) ABSTRACT

In code division multiple access (CDMA) cellular-based communication systems in which a user station can demodulate multiple signals, not necessarily coming from the same base station, a method to rapidly identify at the user station spread spectrum code offsets at which actual signal paths exist. In such a system a plurality of base stations transmit data unmodulated pilot signals, wherein each of the pilot signals comprises a radio frequency signal modulated by a predetermined spread spectrum code at a predetermined rate. The base stations modulate their respective radio frequency signals with the same spread spectrum code but each of the base stations have a different, predetermined offset of the spread spectrum code from other of the base stations in a given vicinity, or, alternatively, the base stations modulate their respective radio frequency signals with different spread spectrum codes that are known by the user station. The method for the communications unit to identify the arrival time of each path from a specific base station by selecting specific code offsets with which to demodulate the signals of different paths originating from the specific base station, comprises the following steps. First, a radio frequency signal modulated by a predetermined spread spectrum code is received. The radio frequency signal is demodulated to produce a demodulated signal. A generated signal encoded with the spread spectrum code at a rate substantially the same as the predetermined rate is provided. A predetermined set of code offsets within which to search for the signals of different paths of the base stations is also provided. A new subset of code offsets is selected by a. processing the demodulated signal with the generated signal at a first predetermined offset of the set of code offsets to produce a decision value related to a degree of correlation between the demodulated signal and the generated signal, b. determining an SNR measurement at the predetermined offset using the decision value, c. repeating the steps of processing, and determining for the remaining the offsets in the set of code offsets for a predetermined number of iterations, and d. continuing further processing for a subset of code offsets which belong to the set of code offsets and which are of a predetermined number and have the largest SNR values. The step of selecting a new subset of code offsets is repeated for a predetermined number of iterations.

23 Claims, 3 Drawing Sheets

FAST AND ACCURATE IDENTIFICATION OF SPREAD SPECTRUM SIGNALS

TECHNICAL FIELD OF THE INVENTION

The present invention relates to CDMA spread spectrum cellular communication systems in which an unmodulated (pilot) spread spectrum signal, such as a pseudonoise (PN) signal, is transmitted by each base station with a base station specific PN code offset and utilized by a user station to identify a number of existing base stations and provide a strength indication for the signal from each base station as it is received at the user station. In particular, the present invention relates to a novel method and implementation to achieve fast identification of pilot paths originating from any transmitting base station and having any specified signal-to-noise ratio (SNR).

BACKGROUND OF THE INVENTION

Spread spectrum communications have been established as one of the more viable alternatives for cellular systems. In such systems, the particularly desirable property of low cross-correlations of PN spread spectrum codes for signals separated in time by an amount equal to or larger than one code element (chip), has given rise to the use of the same PN code in the same frequency band by different base stations in order to maximize capacity and facilitate system engineering. A PN code is a binary pseudorandom code and each of its elements is called a chip. Several well known sets of PN codes exist, such as M sequences and Gold codes. Because of the pseudonoise code properties, the code autocorrelation results a peak only when the offset between the received and the local PN codes is less than a chip. In that case, the received and local codes become effectively synchronized.

Signal separation among different cells can be achieved by having the different base stations use different offsets of the same PN code. The user station can simultaneously demodulate signals that are strong enough to be discriminated from background noise and are separated by more than one chip in time. Therefore, the user station, which is typically mobile, can simultaneously maintain communication with more than one base station, to enable smooth transitions between base stations. This concept is known in the literature as soft hand-off. To facilitate soft hand-off, the user station may identify received pilot multipaths from several base stations that use the same PN code but have an appropriately different PN code offset, measure the combined SNR of multipaths corresponding to a pilot signal transmitted by each of the base stations, and report the pilot PN code offsets and the SNR measurements to the base station or stations with which it currently communicates.

Since cell sites can have different sizes and the user station can be at any point within a particular cell, the propagation delay of the pilot transmitted by a base station can be on the order of a few tens to a few hundred chips. Once a user station has established communications with at least one base station, that base station communicates to the user station certain predetermined parameters relating to information about the cellular system. Among those parameters is timing information, in terms of PN code offsets from the base station's pilot offset, for PN codes of pilots corresponding to other base stations. Those base stations, and the corresponding pilots, are categorized into sets depending on the likelihood for the base station to participate in soft handoff.

For each pilot, the propagation delay range establishes a PN code offset uncertainty area around the PN code offset with which the pilot was originally transmitted by the corresponding base station. The user station needs to examine the entirety of such PN code offset uncertainty area, determine each offset at which a path with an SNR above a specified level exists, accurately measure the combined SNR for the possibly more than one paths originating from the pilot signal that is transmitted by each base station, and report the results to the base station or stations currently supporting the communication.

The user station needs to maintain pilot signals in sets, called soft hand-off sets. The set of each pilot from a particular base station is primarily determined by the corresponding SNR. There are usually several pilot signals in each set and each of them needs to have its strength and relative offset determined within a set-dependent time period. Pilot sets that are more important for reliable communications need to be updated more frequently. For proper performance, excessive delays between successive SNR measurements must be avoided. Thus, there is a need to minimize the time required to reliably identify the offsets corresponding to usable pilot signals. Only for those offsets are subsequent time consuming SNR measurements performed. Another reason for minimizing the time required for identification of usable pilot paths is to limit power consumption at the user station.

Finally, in addition to soft handoff, the user station needs to identify offsets corresponding to paths with the largest SNRs in order to assign those paths to available demodulators, also known as Rake fingers, and maximize the total SNR in order to optimize the communication quality. Although paths corresponding to the information signal need to be identified for that purpose, if the transmission of signals from the base station is synchronous, identifying a pilot path is equivalent to identifying an information signal path. This goal also requires continuous search of a window for path identification and SNR measurements.

SUMMARY OF THE INVENTION

The present invention operates in code division multiple access (CDMA) cellular-based communication systems in which a user station can demodulate multiple signals, not necessarily coming from the same base station. In accordance with the present invention, a method is provided to rapidly identify at the user station spread spectrum code offsets at which actual signal paths exist. In such systems a plurality of base stations transmit data unmodulated pilot signals, wherein each of the pilot signals comprises a radio frequency signal modulated by a predetermined spread spectrum code at a predetermined rate. The base stations modulate their respective radio frequency signals with the same spread spectrum code but each of the base stations have a different, predetermined or random offset of the spread spectrum code from other of the base stations in a given vicinity, or, alternatively, the base stations modulate their respective radio frequency signals with different spread spectrum codes that are known by the user station. The inventive method, for the communications unit to identify the arrival time of each path from a specific base station by selecting specific code offsets with which to demodulate the signals of different paths originating from the specific base station, comprises the following steps. First, a radio frequency signal modulated by a predetermined spread spectrum code is received. The radio frequency signal is demodulated to produce a demodulated signal. A generated signal encoded with the spread spectrum code at a rate substantially the same as the predetermined rate is provided.

A predetermined set of code offsets within which to search for the signals of different paths of the base stations is also provided. A new subset of code offsets is selected by processing the demodulated signal with the generated signal at a first predetermined offset of the set of code offsets to produce a decision value related to a degree of correlation between the demodulated signal and the generated signal, determining an SNR measurement at the predetermined offset using the decision value, repeating the steps of processing, and determining for the remaining the offsets in the set of code offsets for a predetermined number of iterations, and continuing further processing for a subset of code offsets which belong to the set of code offsets and which are of a predetermined number and have the largest SNR values. The step of selecting a new subset of code offsets is repeated for a predetermined number of iterations.

In some embodiments the user station may participate in the process of establishing communication with a base station, other than the one or ones currently supporting the communication, by measuring the signal to noise ratio (SNR) of a signal transmitted by that base station and reporting it, together with the base station identifying PN code offset and possibly other additional information, to the base station or stations supporting the current communication. The method can be easily applied to any SNR level of interest by straightforward modification of the algorithmic parameters to achieve optimized tradeoffs (minimum survey time vs. high accuracy) for each SNR.

The identification of offsets deemed to correspond to possible signal paths originating from the same base station is typically achieved by multiple scans of the uncertainty offset window. Each scan may consist of a correlation at each offset until all offsets in the uncertainty offset window are examined. The length of the correlation may vary. The correlation may be optimized for the particular SNR range subject to the requirement to minimize the time needed to identify each path with a desired accuracy and measure its SNR.

These and other features of the invention will be apparent to those skilled in the art from the following detailed description of the invention, taken together with the accompanying drawings.

BRIEF DESCRIPTION OF THE DRAWINGS

The features, objects, and advantages of the invention disclosed herein will become more apparent from the detailed description of the invention. The following drawings are meant to provide a reference for exemplary embodiments of the invention.

DETAILED DESCRIPTION OF THE PREFERRED EMBODIMENT

The invention presents an algorithm and a simple implementation for fast identification of offsets corresponding to paths of usable SNR. The parameters of the algorithm can be easily and dynamically adapted to the SNRs of interest.

Figure 1:
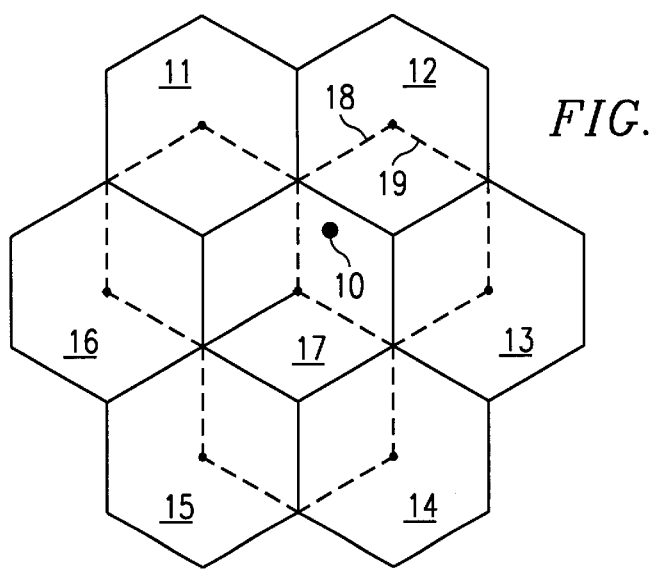
FIG. 1 is an exemplary illustration of a cellular system and a user station.

FIG. 1 presents a typical scenario for the communication system of interest. The user station 10 receives signals consisting of the one transmitted by the base station in the user station's current cell 17 as well as the signals transmitted by base stations in adjacent cells 11, 12, 13, 14, 15, 16, (six of them are depicted). If the transmission at each cell is sectorized, the user station 10 receives a signal from the sectors of the adjacent cells that are directed generally toward the user station 10, indicated with the dotted lines. Thus, for example, the sector of adjacent cell 12 from which the user station 10 receives a signal is that bound by dotted lines 18, 19.

Because of possible multipath propagation, several replicas of a signal transmitted by a base station may be received at the user station at different delays (code offsets). The user station 10 may have to identify the offset for each arriving signal from each base station and measure its SNR.

Figure 2:
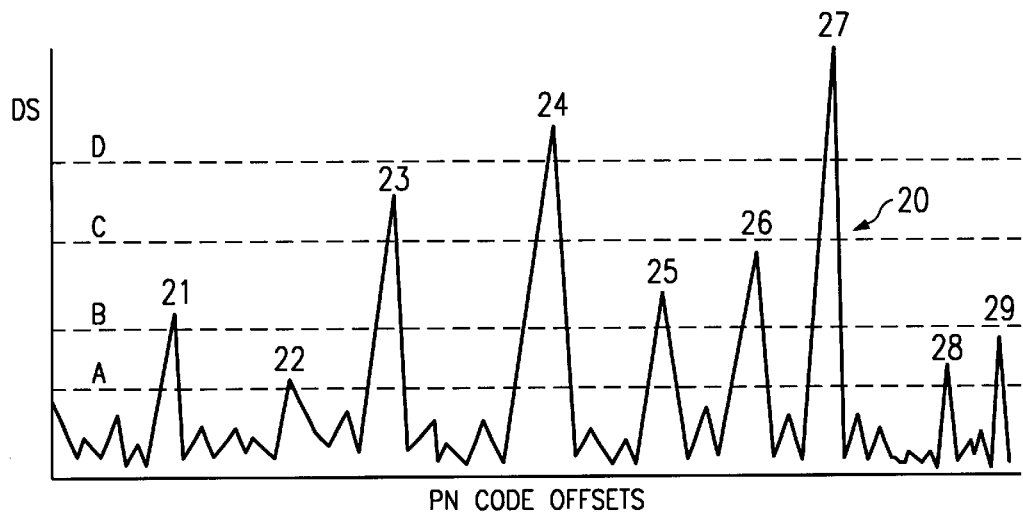
FIG. 2 depicts the multiple paths of various strength that are received by the user station at different chip offsets.

FIG. 2 illustrates an exemplary profile 20 of the decision statistic values obtained for various PN code offset hypotheses. The vertical axis DS represents the decision statistic, while the horizontal axis represents PN code offset hypotheses. Assuming that each of the peaks 21, 22, 23, 24, 25, 26, 27, 28, 29, identifies a path at a different search window, the paths can be classified in sets according to which of the thresholds A–C the path SNR exceeds. Thus, the set of paths that exceed A comprises all of the peaks 21, 22, 23, 24, 25, 26, 27, 28 and 29. The set of peaks that exceed B comprises peaks 21, 23, 24, 25, 26 and 27. The set of peaks that exceed C comprises peaks 23, 24 and 27. The set of peaks that exceed D comprises peaks 24 and 27.

Figure 3:
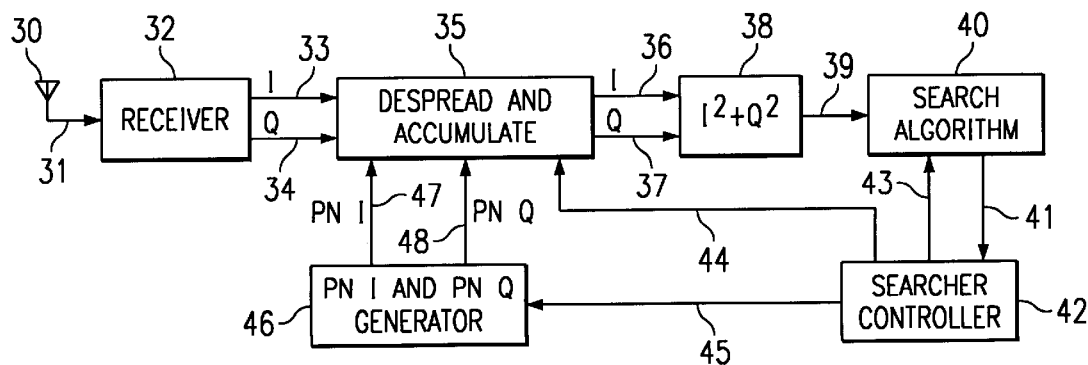
FIG. 3 is a block diagram of the main user station functions that relate to the disclosed invention.

FIG. 3 is a high level block diagram of a typical path identification unit in which the preferred embodiment of the present invention may operate. The user station receives a quadrature phase shift keyed ("QPSK") modulated spread spectrum signal at antenna 30, which is transmitted on transmission line 31 to receiver 32. Receiver 32 filters and downconverts the signal to a lower frequency. The "I" and "Q" components of the signal are demodulated from the signal by receiver 32 and then provided on lines 33 and 34 to despreading and accumulating element 35. Typically, the demodulated signal is sampled regularly, and the sample values are digitized. These digitized values are what are provided to despreading element 35. This digitization permits digital processing to accomplish the subsequent steps in the communications process, for example, via a digital signal processor (DSP) or an application specific integrated circuit (ASIC).

Despreading and accumulating element 35 multiplies the received signal I and Q components by the I and Q PN codes generated by I and Q PN generator 46. The results of these multiplications are then summed, or accumulated, over a specific number of chip periods which mainly depend on the phase stability properties of the signal. In the exemplary embodiment, both the PN codes generated by I and Q PN generator 46 and the incoming PN codes are assumed to be generated by a pair of maximal length shift registers. Thus, path identification which is performed in terms of offset determination is equivalent to determining the correct time offset for the shift registers for which it is decided that a path exists.

Assuming that the received signal is QPSK modulated, the I and Q components at the output of despreading and accumulating element 35 are provided on lines 36 and 37 to a noncoherent envelope detector element 38 where they are squared and then summed to remove the phase dependency from the result, and have the result depend only on the PN codes offsets. The output of noncoherent envelope detector element 38 constitutes the decision statistic ("DS") which is provided on line 39 to path identification unit 40 which implements the search algorithm for the path identification method of the preferred embodiment of the present invention.

After a correlation at each offset, via control line 41 path identification unit 40 instructs searcher controller 42 to perform correlation for the next examined chip offset. The correlation period is usually such that the signal maintains substantially the same phase. The accumulation in despreading and accumulating element 35 is responsive to the searcher controller 42 via control signals provided on control line 44, for specifying the length of the correlation period, outputting the final result, and resetting the result of the summation at the end of each correlation period.

The path identification unit 40 communicates the results to the searcher controller 42. The searcher controller 42 determines how the additional searches, if any, will be performed, or if it will switch to a new search area. The searcher controller 42 controls path identification unit 40 via control line 43. To examine the next, not necessarily successive, code offset, the searcher controller 42 provides the necessary code offset information to the I and Q PN code generators 46. The interaction between the path identification unit 40, the searcher controller 42 and the I and Q PN generator 46 are described in detail below, as the particular aspects of the invention are presented in the remaining paragraphs.

The method to search the uncertainty area, which is sometimes referred to herein as the "search area", can be based on any conventional approach, such as serial search, Z-search, and expanded window search. For example, for background on this, see the techniques discussed in "*A Unified Approach to Serial Search Spread-Spectrum Code Acquisition—Part I: General Theory*," by A. Polydoros and C. L. Weber, IEEE Trans. Commun., vol. COM-32, pp. 542–549, May 1984; "*Generalized Serial Search Code Acquisition: The Equivalent Circular State Diagram Approach,*" by A. Polydoros and M. K. Simon, IEEE Trans. Commun., vol. COM-32, pp. 1260–1268, December 1984; and "*A Unified Approach to Serial Search Spread-Spectrum Code Acquisition—Part II: A Matched Filter Receiver,*" by A. Polydoros and C. L. Weber, IEEE Trans. Commun., vol. COM-32, pp. 550–560, May 1984.

Once the search area has been determined using known techniques, usually from predetermined parameters that have been communicated from the base station or stations currently supporting communication, the searcher performs a correlation for each hypothesis. (A "hypothesis", as used herein, is a specific code offset interval which may be smaller than one chip interval and used to test for correlation value).

The result of the correlation may be processed in two ways. With the first approach, each correlation result can contribute towards an SNR measurement at the corresponding offset. After a first, predetermined number of scans (correlations), the SNR measurement at each offset is deemed to be sufficiently reliable to provide an indication about the likelihood of actual path existence at the corresponding offset. The aforementioned number of scans (correlations) is significantly smaller than the one needed to obtain an SNR measurement with the required accuracy for the purposes of soft-handoff and finger allocation. Once the predetermined number of scans is completed, a first, predetermined number of offsets for which the SNR values are the largest are maintained for further consideration. The process continues only for those offsets, until a second, predetermined number of scans (correlations) is completed. Then, a similar decision regarding offsets possibly corresponding to actual paths is made and a second, predetermined number of offsets is maintained for further consideration. Those offsets are again the ones for which the SNR values are the largest. Clearly, the second number of offsets maintained for path identification is smaller than the first. This process iterates until a final, predetermined number of paths is selected for SNR measurements. Once that selection is made, the path identification part of the process is complete. The offsets identified may or may not correspond to actual paths. If an offset does not correspond to an actual path, this will be identified by the SNR measurement part of the process. After that part of the process is complete, an offset may be dismissed if the corresponding SNR measurement does not exceed a predetermined value. An indirect advantage of using SNR measurements for the purpose of path identification is that those measurements may also be utilized as part of the final SNR measurements performed for the few selected offsets.

With the second approach, the correlation result at each offset is compared, after appropriate processing, to a threshold, which is typically normalized by a background interference estimate, and a counter corresponding to that offset is increased only if the threshold was exceeded. The path identification process is identical to the one described above when the correlation result is used to contribute towards an SNR measurement. At the completion of each predetermined number of scans, the offsets selected for further consideration are the ones with the largest value for the corresponding counters, instead of the largest SNR values.

The previously described process achieves identification of offsets corresponding to paths with an SNR in the range of interest with practically complete certainty after a number of correlations that is much smaller than the one required to obtain relatively accurate SNR measurements at each offset. Identification of paths in different SNR ranges is easily accomplished by simple modification of the threshold value and/or the correlation length. Time consuming SNR measurements can then follow only for the few offsets identified by the described process.

If path identification is based on comparing the correlation result to a threshold, when the threshold is exceeded, a counter corresponding to that particular hypothesis is increased. There is a one-to-one correspondence between each counter and each code hypothesis in the uncertainty area.

If the uncertainty area contains a relatively large number of hypotheses, it can be split to several smaller ones which are then examined separately according to any of the previously mentioned search strategies. In that manner, the memory size needed to store the correlation results (number of SNR measurements or number of counters) is kept relatively small and within acceptable, cost effective limits. Another reason for keeping the search area relatively small is to avoid having a significant time drift due to the mismatch between the transmit and receive clocks of the communications unit in which the method operates by the time the examination of the search area is complete. The search area is scanned multiple times. This is a viable option because the total uncertainty area is usually limited to a maximum of a few hundred chips and it is the result of propagation delays relative to a known PN code offset at the transmitting base station.

For improved time efficiency and accuracy of the overall search, the total number of such multiple tests (scans) may be made to depend on the minimum SNR of paths whose offsets need to be found. Each signal may, in such case, be classified in different sets according to the combined SNR of its multipaths. For example, in IS-95 based systems, four sets of pilot signals are separately kept, an "active set" of approximately 3–5 pilots having the highest SNR values, a "candidate set" of approximately 5–10 pilots having a lower SNR values than those in the active set but high enough to potentially establish communication with at a later time instant, a "neighbor set" of approximately 20 pilots having an even lower SNR than the candidate set pilots, and a "remaining set" containing the remaining pilots in the system with the lowest SNR at the user station. To accommodate possible SNR variations between successive scans of the same search area, the considered SNR range for the paths in the search area may be somewhat larger than the one specified under stationary conditions.

If threshold comparisons are used for path identification, the threshold for each correlation test may also be made to depend on the minimum SNR of paths whose offsets need to be found. Based on the minimum SNR value, appropriate values for the threshold and the number of multiple tests, can be easily found in theory by using well known distribution functions for the signal values in an additive-white-Gaussian noise channel and in fading channels (Rayleigh, Nakagami, Rician, etc. fading). Simulations and actual measurements can further support the selected settings, if desired.

The threshold should preferably be set to above the combined background noise and interference level (noise floor). This quickly eliminates code offsets that do not correspond to a useful path. The threshold is set by scaling the noise floor with a factor that is appropriate to the minimum SNR value of the path that is desired to be identified. The objective is to select the threshold value so that the histogram generated by the contents of the counters provides accurate statistical identification of actual path offsets with SNR above a specified minimum.

Clearly, the larger the minimum path SNR, the smaller the required number of scans of the search area and, if thresholding is used, the larger the threshold value, and the better the histogram's resolution, i.e., the larger the difference among the number of "hits" (threshold is exceeded) at offsets corresponding to actual paths and the number of hits at the remaining offsets. Moreover, the fact that each hypothesis is scanned multiple times in a non-consecutive manner provides for considerably effective diversity against fading. This is not possible with the conventional SNR measurement approach.

In order to limit the number of total scans for a search area and reduce the time and power requirements of the process, offsets resulting in appropriately small values of hits (absolute values or values relative to the number of hits for other offsets) after a certain number of scans may not be further examined. This is particularly advantageous for paths with strengths that are considerable above the noise floor (path SNRs considerable above 0 dB, e.g. 5 dB). For that purpose, benchmarks are introduced in the search process. A benchmark is simply specified by the pair of a number of search iterations and a number of the larger SNR values, or the number of hits, if the threshold method is used for path identification. The benchmarks can be absolute or relative.

Absolute benchmarks consider that the number of hits or the SNR value will statistically be above a corresponding level after a certain number of search iterations. The number of hits for each path depends on the path SNR and the threshold setting. The number of hits specified in the benchmark should be smaller than or equal to the number of hits that will statistically result for the minimum SNR of interest and larger than the number of hits that will statistically result from the interference with very large probability. The number of search iterations specified in the benchmark is such that it provides the required statistical accuracy. Only the offsets with counts containing a number of hits equal to or larger than the one specified in the benchmark are considered in further search iterations after each benchmark. Similar concepts can be applied when the SNR measurement at each offset is used for path identification.

The search process offers the opportunity to introduce relative benchmarks. Relative benchmarks exploit the fact that only a few of the examined offsets correspond to actual paths. Therefore, the number of offsets selected for further consideration after each benchmark can be predetermined to be a certain number larger than or equal to the maximum number of expected actual paths. Relative to a later benchmark, an earlier benchmark should specify the selection of a larger or equal number of offsets. In that manner, most offsets that do not correspond to actual paths are quickly rejected and the search process progressively continues only for a very small number of offsets.

By appropriately setting the benchmarks, offsets corresponding to actual paths are almost surely maintained among benchmarks and are included in the final ones selected after an appropriately large number of search iterations. Relative benchmarks are obviously less sensitive to inappropriate threshold settings, SNR assumption errors, and fading. This is especially true if SNR measurements are used for path identification.

Figure 4:
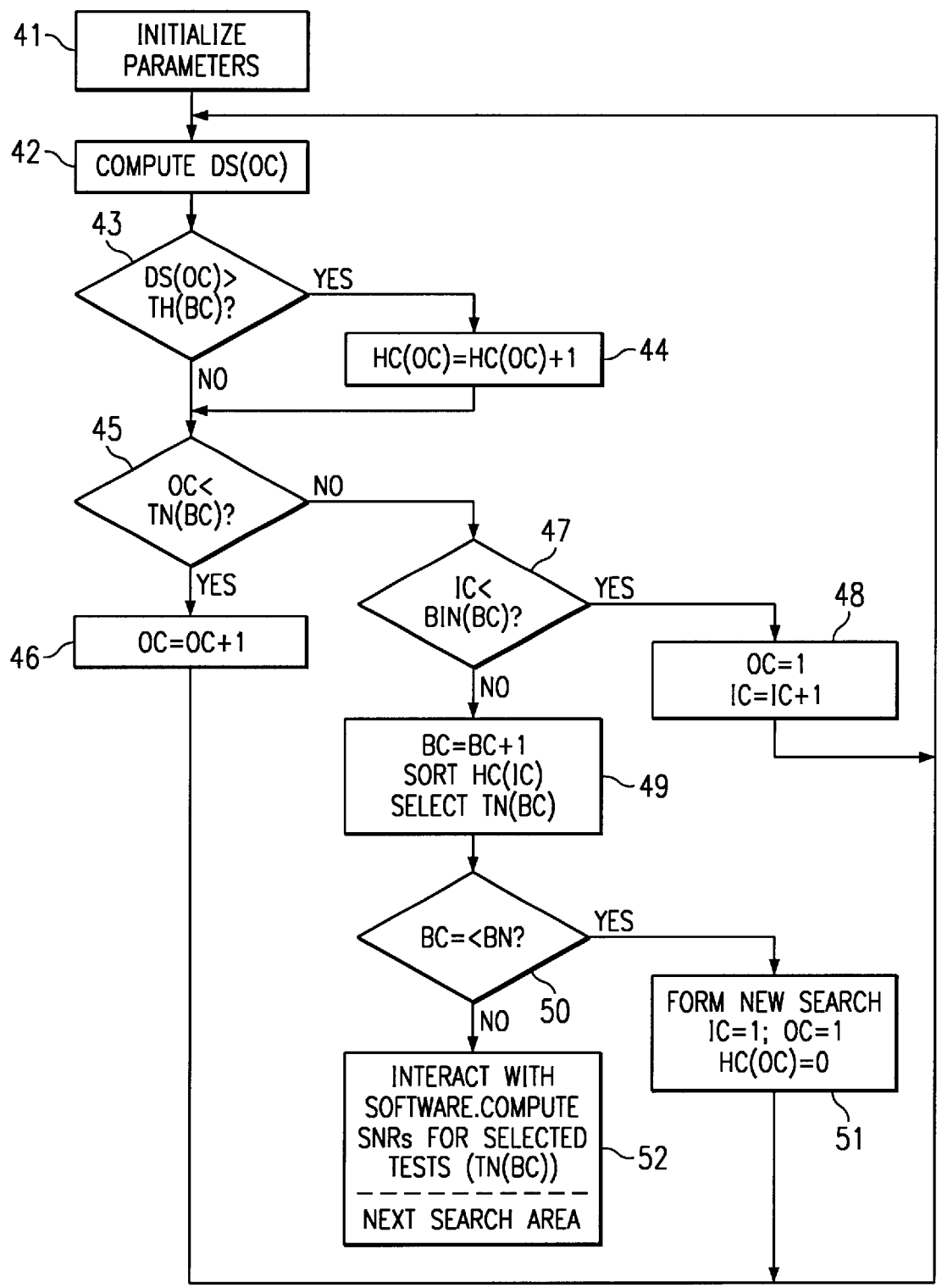
FIG. 4 is a flowchart illustrating the algorithm and one of its possible implementations for the disclosed invention.

An exemplary embodiment of the search process using the threshold comparison for the decision statistic approach is described by the flowchart in FIG. 4. The notation for the parameters used by the algorithm is as follows: OC is the Offset Counter, IC is the Iteration Counter, BC is the Benchmark Counter, HC(OC) is the Hit Counter (function of OC, vector), TH(BC) is the Threshold (function of BC, vector), BIN(BC) is the Benchmark for Number of Iterations (function of BC, vector), BN is the Number of Benchmarks, and TN(BC) is the Number of Tests (function of BC, vector).

In the beginning of the search process for a new search area, the parameters are initialized at block 41. The parameters and their initial values are defined hereinbelow, as the function for each block in the flowchart is explained.

The offset counter (OC) is initialized to the first offset in the search area; OC=1. For the beginning of the search process, if N (N>=1) tests are performed for each chip interval, incrementing OC by 1 corresponds to advancing the code offset by 1/N chip intervals. In other words, the successive correlations are performed for successive 1/N chip intervals and OC maps to successive 1/N-chip offsets. For example, typical values for N are 1, and 2.

Subsequently, the decision statistic (DS) is evaluated in block 42 for the particular code offset corresponding to the value of OC. Thus, value of DS depends on OC and this dependence is denoted as DS(OC).

Once DS is evaluated, it is compared in block 43 against the threshold (TH) for the particular benchmark. The current benchmark is indicated by the Benchmark Counter (BC). The threshold value may be a function of the benchmark, i.e. a different threshold value may be used for the second benchmark than for the first one, etc. The dependence of TH on the benchmark is denoted by TH(BC). The initial value for BC is BC=0.

If DS(OC) exceeds TH(BC), the Hit Counter (HC) for the corresponding test is increased by one in block 44. The mapping of HC to the corresponding OC is denoted by HC(OC). The initial value of HC for all offsets is 0.

Regardless of the result of the test in step 44, the next step is to check if the end of the search area has been reached. This is accomplished by comparing OC with TN which denotes the total Number of Tests in block 45. Similarly to TH, TN may vary among benchmarks. This dependence is denoted by TN(BC).

If OC is smaller than TN(BC), i.e., the result of the test in block 45 is "YES", then there are more tests to be performed before the end of the search area. The next step is thus block 46, in which OC is increased by one to map to the next chip offset. The process then returns to step 42, and the search process is repeated after evaluating the new DS(OC).

If OC is not smaller than TN(BC), i.e., the result of the test in block 45 is "NO", then the end of the search area has been reached for that particular iteration. The next step is thus block 47, in which the Iteration Counter (IC) value is checked to determine if it is smaller than the Number of Iterations (BIN) for the corresponding benchmark. BIN may depend on the benchmark as identified by BC and this is denoted by BIN(BC). The initial value for IC is IC=1.

If IC is smaller than BIN(BC), i.e., the result of the test in block 47 is "YES", then more search iterations of the search area should be performed. The next step is thus block 48, in which OC is set to one to map the first test of the new search iteration, and IC is increased by one. The search process is repeated after evaluating the new DS(OC).

If IC is not smaller than BIN(BC), i.e., the result of the test in block 47 is "NO", then the total number of iterations for the particular benchmark has been achieved. The next step is thus block 49, in which the parameters for the next benchmark are indirectly set by increasing BC by one. This advances the index of the vectors and perform the necessary mapping to obtain the new parameters. Subsequently, in the same block 49, the HCs at the examined offsets are sorted according to their value and the TN largest ones are selected for further consideration. TN may be a function of the benchmark and this is denoted as TN(BC).

The next step, in block 50, is to check if BC is smaller than or equal to the total Number of Benchmarks (BN).

If it is, a new search is formed, in block 51, to include only the tests with the largest number of hits as they were selected in block 49. IC and OC are set to one and all elements of the HC vector are set to zero. It should be noted that after the first benchmark is reached, the OC reflects the number of the remaining offsets. For example, increasing OC by one means that the next offset selected for further iterations is examined. That offset may be separated by several chip intervals from the previous one.

If it is not, the last benchmark has been completed, the SNR evaluation for the selected offsets is performed and the process then continues for the next search area in block 52.

Once the principles of the present invention are understood, it should be clear to those of ordinary skill in the art that the exemplary embodiment is open to modifications of some of its criteria. For example, in block 49, instead of selecting a predefined number of offsets with the largest number of hits, the selected offsets may be only the ones for which a certain number of hits has been exceeded for each benchmark. The latter option was previously described as "absolute benchmarks" while the present option implements relative benchmarks.

Figure 5:
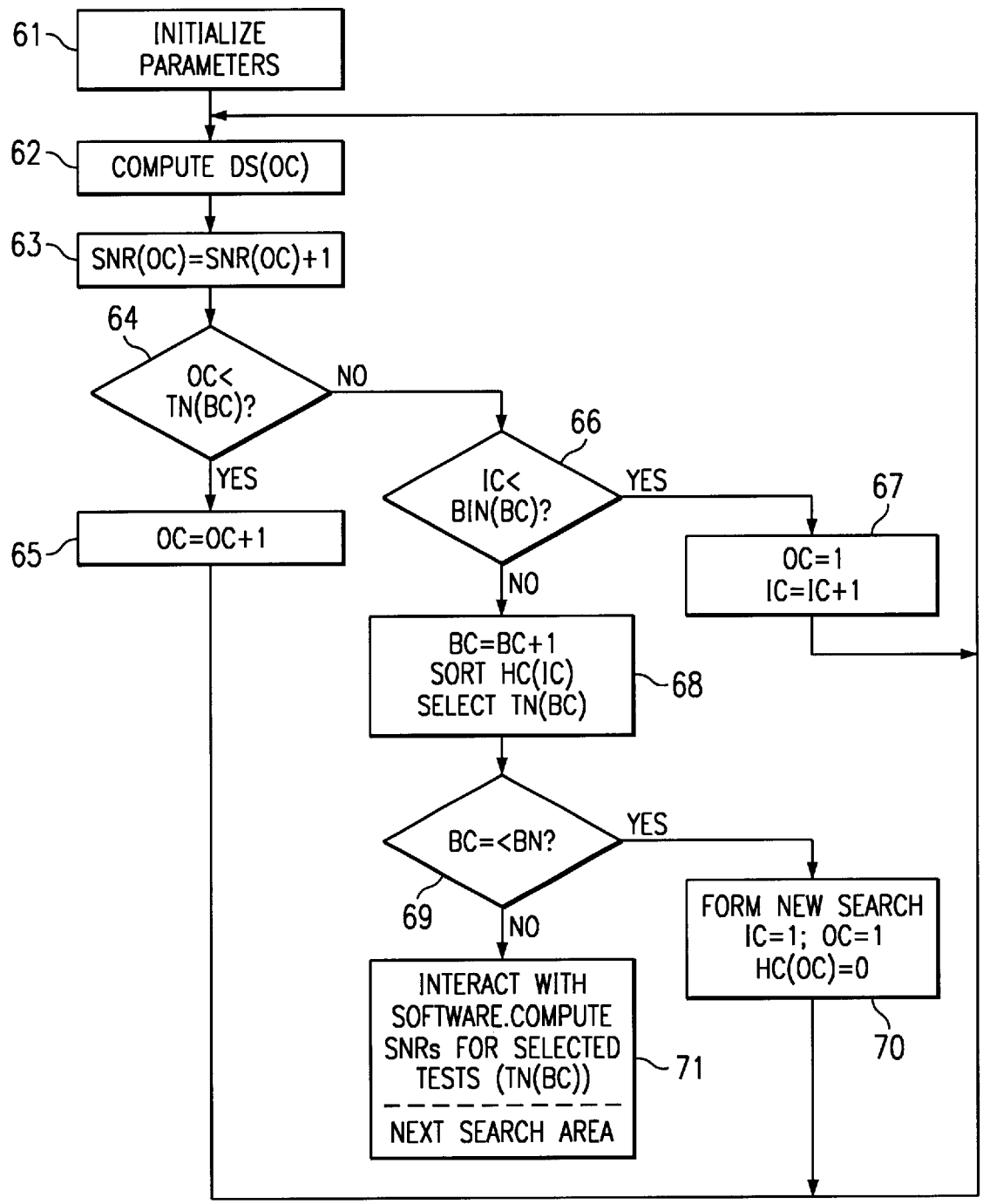
FIG. 5 is a flowchart illustrating the algorithm and another of its possible implementations for the disclosed invention.

The search process when SNR measurements are used at each offset for path identification is almost exactly the same with the threshold comparison process. The basic difference is that a threshold comparison of the decision statistic at each offset is now avoided. An exemplary embodiment of the search process using SNR measurements for path identification is described by the flowchart in FIG. 5. The notation for the parameters used by the algorithm is substantially the same as for the threshold comparison method. The only difference is that the Hit Counter (HC) vector is now replaced by an SNR vector and the decision statistic (DS) at each offset is now the SNR at that offset.

In the beginning of the search process for a new search area, the parameters are initialized at block 61. The parameters and their initial values are defined as the function for each block in the flowchart is explained hereinbelow.

The offset counter (OC) is initialized to the first offset in the search area; OC=1.

Subsequently, the SNR at the corresponding offset OC, is evaluated in block 62. The dependence of the SNR on OC is denoted as SNR(OC).

Once the SNR is evaluated for the new iteration, it is added to the SNR value accumulated during the previous iterations in block 63. The initial SNR at each offset is zero.

The next step is to check if the end of the search area has been reached. This is accomplished in block 64 by comparing OC with TN which denotes the total Number of Tests. TN may vary among benchmarks. This dependence is denoted by TN(BC).

If OC is smaller than TN(BC), i.e., the result of the test in block 64 is "YES", then there are more offsets with SNR measurements to be performed before the end of the search area. The next step is thus block 65, in which OC is increased by one to map to the next chip offset, and the search process is repeated after evaluating the new SNR (OC).

If OC is not smaller than TN(BC), i.e., the result of the test in block 64 is "NO", then the end of the search area has been reached for that particular iteration. The next step is thus block 66, in which the Iteration Counter (IC) is checked to determine whether it is smaller than the Number of Iterations (BIN) for the corresponding benchmark. BIN may depend on the benchmark as identified by BC and this is denoted by BIN(BC). The initial value for IC is IC=1.

If IC is smaller than BIN(BC), i.e., the result of the test in block 66 is "YES", then more search iterations of the search area should be performed. The next step is thus block 57, in which OC is set to one to map the first test of the new search iteration and IC is increased by one. The search process is repeated after evaluating the new SNR(OC).

If IC is not smaller than BIN(BC), i.e., the result of the test in block 66 is "NO", then the total number of iterations for the particular benchmark has been achieved. The next step is thus block 68, in which the parameters for the next benchmark are indirectly set by increasing BC by one. This will advance the index of the vectors and perform the necessary mapping to obtain the new parameters. Subsequently, the SNR values at the examined offsets are sorted according to their value and the TN largest ones are selected for further consideration. TN may be a function of the benchmark and this is denoted as TN(BC).

The next step, in block 69, is to check if BC is smaller than or equal to the total Number of Benchmarks (BN).

If it is, i.e., the result of the test in block 69 is "YES", then a new search is formed, in block 70, to include only the tests with the largest SNR values as they were selected in block 68. IC and OC are set to one and all elements of the SNR vector are set to zero. It should be noted that after the first benchmark is reached, the OC reflects the number of the remaining offsets. For example, increasing OC by one means that the next offset selected for further iterations is examined. That offset may be separated by several chip intervals from the previous one.

If it is not, i.e., the result of the test in block 69 is "NO", then the last benchmark has been completed. Additional SNR measurements are then performed for the selected offsets in order to provide the final SNR evaluations and the process then continues for the next search area in block 71.

The disclosed invention provides an extremely effective method to distinguish pilot paths with useful SNR within a short time period that is well within the acceptable limits for the particular function. It offers a simple implementation that utilizes units that are usually required by the user station to perform other necessary functions. Once the offsets where useful pilot signals are determined, the SNR measurements can be subsequently performed in a conventional manner.

Although the present invention and its advantages have been described in detail, it should be understood that various changes, substitutions and alterations can be made herein without departing from the spirit and scope of the invention as defined by the appended claims.

What is claimed is:

1. In a code division multiple access communications system in which a plurality of base stations transmit data unmodulated pilot signals, each of said pilot signals comprising a radio frequency signal modulated by a predetermined spread spectrum code at a predetermined rate, said base stations modulating their respective radio frequency signals with the same spread spectrum code but with each of said base stations having a different, predetermined or random offset of said spread spectrum code from other of said base stations in a given vicinity, or, alternatively, said base stations modulating their respective radio frequency signals with different spread spectrum codes that are known by a communications unit, and wherein a pilot signal from a base station may traverse multiple paths to said communications unit, a method for said communications unit to identify one of said pilot signals, comprising the steps of:

A. receiving a radio frequency signal modulated by a predetermined spread spectrum code;
   B. demodulating said radio frequency signal to produce a demodulated signal;
   C. providing a generated signal encoded with said spread spectrum code at a rate substantially the same as said predetermined rate;
   D. providing a predetermined set of code offsets within which to search for the signals of different paths of said base stations,
   E. selecting a new subset of code offsets by
      a. processing said demodulated signal with said generated signal at a first predetermined offset of said set of code offsets to produce a decision value related to a degree of correlation between said demodulated signal and said generated signal,
      b. determining whether said decision value exceeds a predetermined threshold and if so increasing by one the value of a counter corresponding to said first predetermined offset of said set of code offsets,
      c. repeating said steps of processing, and determining for the remaining said offsets in said set of code offsets for a predetermined number of iterations, and
      d. continuing further processing for a subset of code offsets which belong to said set of code offsets and which are of a predetermined number and have the largest counter values; and
   F. repeating step E. for a predetermined number of iterations.

2. A code division multiple access communications system according to claim 1 wherein in each of said iterations of step E. said predetermined threshold in substep E.b. differs from said predetermined thresholds in other iterations of step E.

3. A code division multiple access communications system according to claim 1 wherein in each of said iterations of step E. said predetermined number of iterations in substep E.c. differs from said predetermined number of iterations for other iterations of step E.

4. A code division multiple access communications system according to claim 1 wherein in each of said iterations of step E. said predetermined number of offsets in substep E.d. differs from said predetermined number of offsets from other iterations of step E.

5. A code division multiple access communications system according to claim 1 wherein said thresholds are normalized in accordance with a background interference estimate.

6. A code division multiple access communications system according to claim 1 wherein said received signal is QPSK modulated and said decision statistic is the noncoherent demodulation result of said signal.

7. A code division multiple access communications system according to claim 1 wherein said counter values are maintained in storage after each iteration.

8. In a code division multiple access communications system in which base stations transmit pilot signals, said pilot signals comprising a radio frequency signal modulated by predetermined spread spectrum code(s) at a predetermined rate, said base stations modulating their respective radio frequency signals with the same spread spectrum code(s) but with each of said base stations having a different, predetermined offset of said spread spectrum code(s) from other of said base stations in a given vicinity, and a predetermined set of code offsets within which to search for said base stations, a method for a communications unit to identify base stations, comprising the steps of:

A. receiving a radio frequency signal modulated by said predetermined spread spectrum code(s);
   B. demodulating said radio frequency signal to produce a demodulated signal;
   C. sampling said demodulated signal at first regular intervals to produce sampled values;
   D. digitizing said sampled values;
   E. providing digitized spread spectrum code(s) signal having said spread spectrum code(s) at a rate substantially the same as said predetermined rate;
   F. selecting a new set of code offsets by
      a. processing said demodulated signal with said generated signal at first predetermined offset of said set of code offsets to produce a decision value related to a degree of correlation between said demodulated signal and said generated signal,
      b. determining whether said decision value exceeds a predetermined threshold and if so increasing by one a counter corresponding to said first predetermined offset of said set of code offsets,
      c. repeating said steps of processing, and determining for the remaining said offsets in said set of code offsets for a predetermined number of iterations, and d. maintaining for further consideration a predetermined number of offsets which belong to said set of code offsets and have the largest values of said counters, and the corresponding counters; and G. repeating step F for a predetermined number of iterations where each said iteration uses a different said predetermined threshold in step b, a different said predetermined number of iterations in step c and a different said predetermined number of offsets in step d.

9. In a code division multiple access communications system in which base stations transmit pilot signals, said pilot signals comprising a radio frequency signal modulated by predetermined spread spectrum code(s) at a predetermined rate, said base stations modulating their respective radio frequency signals with the same spread spectrum code(s) but with each of said base stations having a different, predetermined offset of said spread spectrum code(s) from other of said base stations in a given vicinity, and a predetermined set of code offsets within which to search for said base stations, a method for a communications unit to identify base stations, comprising the steps of:

A. receiving a radio frequency signal modulated by said predetermined spread spectrum code(s);

B. demodulating said radio frequency signal to produce a demodulated signal;

C. providing a generated signal having said spread spectrum code(s) at a rate substantially the same as said predetermined rate;

D. selecting a new set of code offsets by
   a. processing said demodulated signal with said generated signal at first predetermined offset of said set of code offsets to produce a decision value indicating a measure of the signal-to-noise ratio at said first predetermined offset,
   b. averaging the said signal-to-noise ratio with previous values, if any, at said first predetermined offset,
   c. repeating said steps of processing, and averaging for the remaining said offsets in said set of code offsets for a predetermined number of iterations, and
   d. maintaining for further consideration a predetermined number of offsets which belong to said set of code offsets and have the largest signal-to-noise ratio values, and the corresponding signal-to-noise ratio values; and E. repeating step D for a predetermined number of iterations where each said iteration uses a different said predetermined number of iterations in step c, and a different said predetermined number of offsets in step d.

10. In a code division multiple access communications system in which base stations transmit pilot signals, said pilot signals comprising a radio frequency signal modulated by predetermined spread spectrum code(s) at a predetermined rate, said base stations modulating their respective radio frequency signals with the same spread spectrum code(s) but with each of said base stations having a different, predetermined offset of said spread spectrum code(s) from other of said base stations in a given vicinity, and within a predetermined set of code offsets within which to search for said base stations, a method for a communications unit to identify base stations, comprising the steps of:

A. receiving a radio frequency signal modulated by said predetermined spread spectrum code(s);

B. demodulating said radio frequency signal to produce a demodulated signal;

C. sampling said demodulated signal at first regular intervals to produce sampled values;

D. digitizing said sampled values;

E. providing digitized spread spectrum code(s) signal having said spread spectrum code(s) at a rate substantially the same as said predetermined rate;

F. selecting a new set of code offsets by
   a. processing said demodulated signal with said generated signal at first predetermined offset of said set of code offsets to produce a decision value indicating a measure of the signal-to-noise ratio at said first predetermined offset,
   b. averaging the said signal-to-noise ratio with previous values, if any, at said first predetermined offset,
   c. repeating said steps of processing, and averaging for the remaining said offsets in said set of code offsets for a predetermined number of iterations, and
   d. maintaining for further consideration a predetermined number of offsets which belong to said set of code offsets and have the largest signal-to-noise ratio values, and the corresponding signal-to-noise ratio values; and G. repeating step F for a predetermined number of iterations where each said iteration uses a different said predetermined number of iterations in step c, and a different said predetermined number of offsets in step d.

11. In a code division multiple access communications system in which a plurality of base stations transmit data unmodulated pilot signals, each of said pilot signals comprising a radio frequency signal modulated by a predetermined spread spectrum code at a predetermined rate, said base stations modulating their respective radio frequency signals with the same spread spectrum code but with each of said base stations having a different, predetermined offset of said spread spectrum code from other of said base stations in a given vicinity, or, alternatively, said base stations modulating their respective radio frequency signals with different spread spectrum codes that are known by a communications unit, and wherein a pilot signal from a base station may traverse multiple paths to said communications unit, a method for said communications unit to identify one of said pilot signals, comprising the steps of:

A. receiving a radio frequency signal modulated by a predetermined spread spectrum code;

B. demodulating said radio frequency signal to produce a demodulated signal;

C. providing a generated signal encoded with said spread spectrum code at a rate substantially the same as said predetermined rate;

D. providing a predetermined set of code offsets within which to search for the signals of different paths of said base stations, E. selecting a new subset of code offsets by
   a. processing said demodulated signal with said generated signal at a first predetermined offset of said set of code offsets to produce a decision value indicating a measure of the signal-to-noise ratio at said first predetermined offset,
   b. determining whether said decision value exceeds a predetermined threshold and if so increasing by one a counter corresponding to said first predetermined offset of said set of code offsets,
   c. averaging the said signal-to-noise ratio with previous values, if any, at said first predetermined offset
   c. repeating said steps of processing, and averaging for the remaining said offsets in said set of code offsets for a predetermined number of iterations, and
   d. continuing further processing for a subset of code offsets which belong to said set of code offsets and which have the largest signal-to-noise ratio values, and storing the corresponding signal-to-noise ratio values; and F. repeating step E. for a predetermined number of iterations.

12. A code division multiple access communications system according to claim 11 wherein in each of said iterations of step E. said predetermined number of iterations in substep E.c. differs from said predetermined number of iterations for other iterations of step E.

13. A code division multiple access communications system according to claim 11 wherein in each of said iterations of step E. said predetermined number of offsets in substep E.d. differs from said predetermined number of offsets from other iterations of step E.

14. In a code division multiple access communications system in which base stations transmit pilot signals, said pilot signals comprising a radio frequency signal modulated by predetermined spread spectrum code(s) at a predetermined rate, said base stations modulating their respective radio frequency signals with the same spread spectrum code(s) but with each of said base stations having a different, predetermined offset of said spread spectrum code(s) from other of said base stations in a given vicinity, and a predetermined set of code offsets within which to search for said base stations, a method for a communications unit to identify base stations, comprising the steps of:

A. receiving a radio frequency signal modulated by said predetermined spread spectrum code(s);

B. demodulating said radio frequency signal to produce a demodulated signal;

C. sampling said demodulated signal at first regular intervals to produce sampled values;

D. digitizing said sampled values;

H. providing digitized spread spectrum code(s) signal having said spread spectrum code(s) at a rate substantially the same as said predetermined rate;

I. selecting a new set of code offsets by
  e. processing said demodulated signal with said generated signal at first predetermined offset of said set of code offsets to produce a decision value related to a degree of correlation between said demodulated signal and said generated signal,
  f. determining whether said decision value exceeds a predetermined threshold and if so increasing by one a counter corresponding to said first predetermined offset of said set of code offsets,
  g. repeating said steps of processing, and determining for the remaining said offsets in said set of code offsets for a predetermined number of iterations, and
  h. maintaining for further consideration a predetermined number of offsets which belong to said set of code offsets and have the largest values of said counters, and the corresponding counters; and J. repeating step F for a predetermined number of iterations.

15. A code division multiple access communications system according to claim 14 wherein, in performing step J each said iteration uses a different said predetermined threshold in step b.

16. A code division multiple access communications system according to claim 14 wherein, in performing step J each said iteration uses a different said predetermined number of iterations in step c.

17. A code division multiple access communications system according to claim 14 wherein, in performing step J each said iteration uses a different said predetermined number of offsets in step d.

18. In a code division multiple access communications system in which base stations transmit pilot signals, said pilot signals comprising a radio frequency signal modulated by predetermined spread spectrum code(s) at a predetermined rate, said base stations modulating their respective radio frequency signals with the same spread spectrum code(s) but with each of said base stations having a different, predetermined offset of said spread spectrum code(s) from other of said base stations in a given vicinity, and a predetermined set of code offsets within which to search for said base stations, a method for a communications unit to identify base stations, comprising the steps of:

A. receiving a radio frequency signal modulated by said predetermined spread spectrum code(s);

B. demodulating said radio frequency signal to produce a demodulated signal;

C. providing a generated signal having said spread spectrum code(s) at a rate substantially the same as said predetermined rate;

D. selecting a new set of code offsets by
  e. processing said demodulated signal with said generated signal at first predetermined offset of said set of code offsets to produce a decision value indicating a measure of the signal-to-noise ratio at said first predetermined offset,
  f. averaging the said signal-to-noise ratio with previous values, if any, at said first predetermined offset,
  g. repeating said steps of processing, and averaging for the remaining said offsets in said set of code offsets for a predetermined number of iterations, and
  h. maintaining for further consideration a predetermined number of offsets which belong to said set of code offsets and have the largest signal-to-noise ratio values, and the corresponding signal-to-noise ratio values; and F. repeating step D for a predetermined number of iterations.

19. A code division multiple access communications system according to claim 18 wherein, in performing step F each said iteration uses a different said predetermined number of iterations in step c.

20. A code division multiple access communications system according to claim 18 wherein, in performing step F each said iteration uses a different said predetermined number of offsets in step d.

21. In a code division multiple access communications system in which base stations transmit pilot signals, said pilot signals comprising a radio frequency signal modulated by predetermined spread spectrum code(s) at a predetermined rate, said base stations modulating their respective radio frequency signals with the same spread spectrum code(s) but with each of said base stations having a different, predetermined offset of said spread spectrum code(s) from other of said base stations in a given vicinity, and within a predetermined set of code offsets within which to search for said base stations, a method for a communications unit to identify base stations, comprising the steps of:

A. receiving a radio frequency signal modulated by said predetermined spread spectrum code(s);

B. demodulating said radio frequency signal to produce a demodulated signal;

H. sampling said demodulated signal at first regular intervals to produce sampled values;

I. digitizing said sampled values;

J. providing digitized spread spectrum code(s) signal having said spread spectrum code(s) at a rate substantially the same as said predetermined rate;

K. selecting a new set of code offsets by
   e. processing said demodulated signal with said generated signal at first predetermined offset of said set of code offsets to produce a decision value indicating a measure of the signal-to-noise ratio at said first predetermined offset,
   f. averaging the said signal-to-noise ratio with previous values, if any, at said first predetermined offset,
   g. repeating said steps of processing, and averaging for the remaining said offsets in said set of code offsets for a predetermined number of iterations, and
   h. maintaining for further consideration a predetermined number of offsets which belong to said set of code offsets and have the largest signal-to-noise ratio values, and the corresponding signal-to-noise ratio values; and L. repeating step F for a predetermined number of iterations.

22. A code division multiple access communications system according to claim 21 wherein, in performing step L each said iteration uses a different said predetermined number of iterations in step c.

23. A code division multiple access communications system according to claim 21 wherein, in performing step L each said iteration uses a different said predetermined number of offsets in step d.

* * * * *